US005961206A

United States Patent [19]

Eichler

[11] Patent Number: 5,961,206

[45] Date of Patent: Oct. 5, 1999

[54] HEADLIGHT FOR VEHICLE

[75] Inventor: Heike Eichler, Reutlingen, Germany

[73] Assignee: Robert Bosch GmbH, Stuttgart, Germany

[21] Appl. No.: 08/784,948

[22] Filed: Jan. 16, 1997

[30] Foreign Application Priority Data

Jan. 27, 1996 [DE] Germany .......................... 196 02 978

[51] Int. Cl.$^{6}$ ................................ B60Q 1/00; F21V 7/00; F21V 5/00

[52] U.S. Cl. ............................ 362/307; 362/308; 362/61; 362/297; 362/327; 362/299

[58] Field of Search .................................... 362/307, 308, 362/310, 61, 297, 296, 299, 327, 328, 329

[56] References Cited

U.S. PATENT DOCUMENTS

| | | | |
|---|---|---|---|
| 1,410,077 | 3/1922 | Peck | 362/307 |
| 1,598,043 | 8/1926 | Bone | 362/307 |
| 1,928,431 | 9/1933 | Morshead et al. | 362/307 |
| 4,612,608 | 9/1986 | Peitz | 362/307 |
| 4,686,610 | 8/1987 | Cibie et al. | 362/307 |
| 4,803,601 | 2/1989 | Collot et al. | 362/307 |
| 4,825,343 | 4/1989 | Nakata | 362/307 |
| 4,851,968 | 7/1989 | Nino | 362/307 |
| 4,945,455 | 7/1990 | Akizuki | 362/307 |
| 5,055,981 | 10/1991 | Nino | 362/307 |
| 5,584,573 | 12/1996 | Bertling et al. | 362/307 |

FOREIGN PATENT DOCUMENTS

3602262A1 5/1987 Germany .

*Primary Examiner*—Ira S. Lazarus
*Assistant Examiner*—David B. Lee
*Attorney, Agent, or Firm*—Michael J. Striker

[57] ABSTRACT

A headlight for a vehicle has a reflector, a light source, a collecting lens arranged after the reflector in a light outlet direction so that light emitted by the light source is reflected as a converging light beam and the light beam exiting the headlight has an upper bright-dark limit, the reflector being formed so that images of the light source reflected by the reflector are located in an intermediate image plane which is perpendicular to an optical axis of the reflector in the region of a focal point of the collecting lens facing the reflector and above an imaginary line corresponding to a height and side running of the bright-dark limit.

8 Claims, 10 Drawing Sheets

FIG. 1
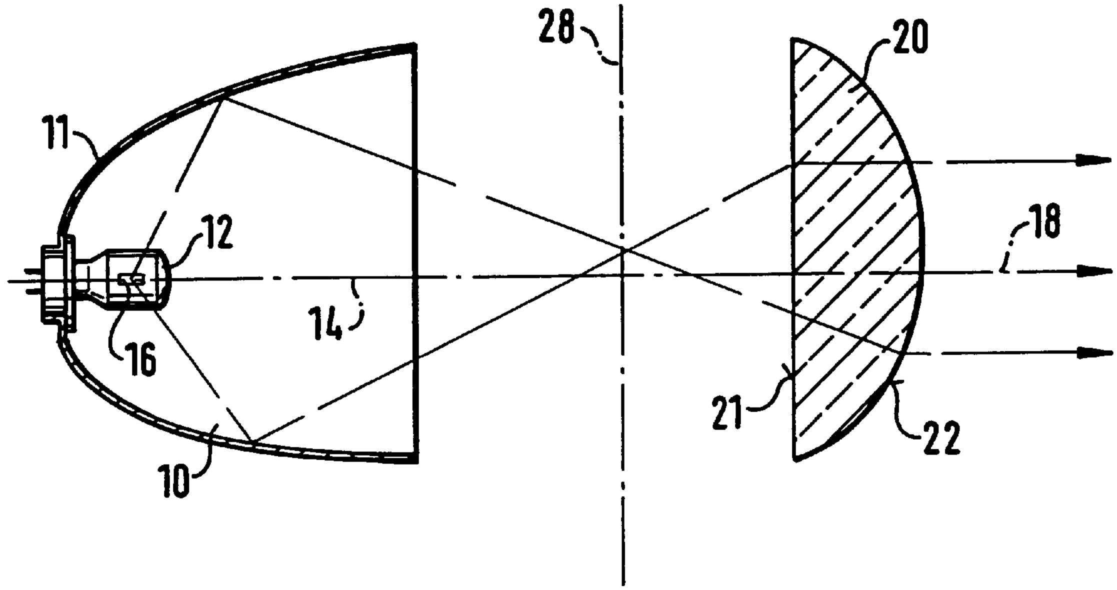
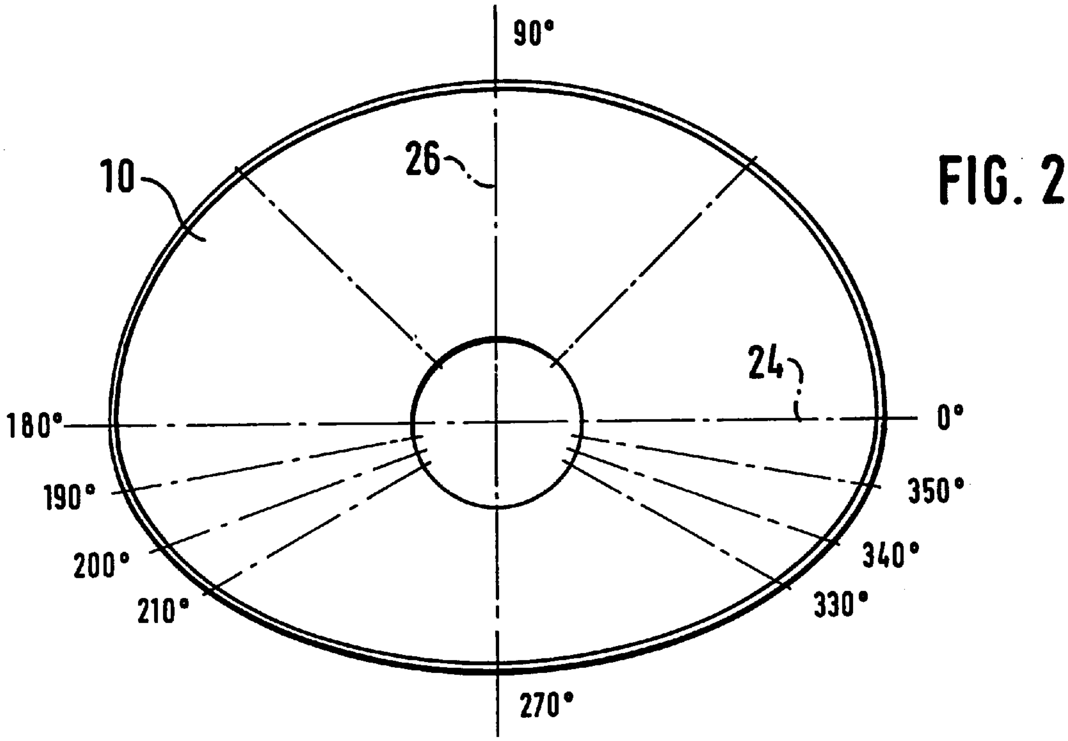
FIG. 2

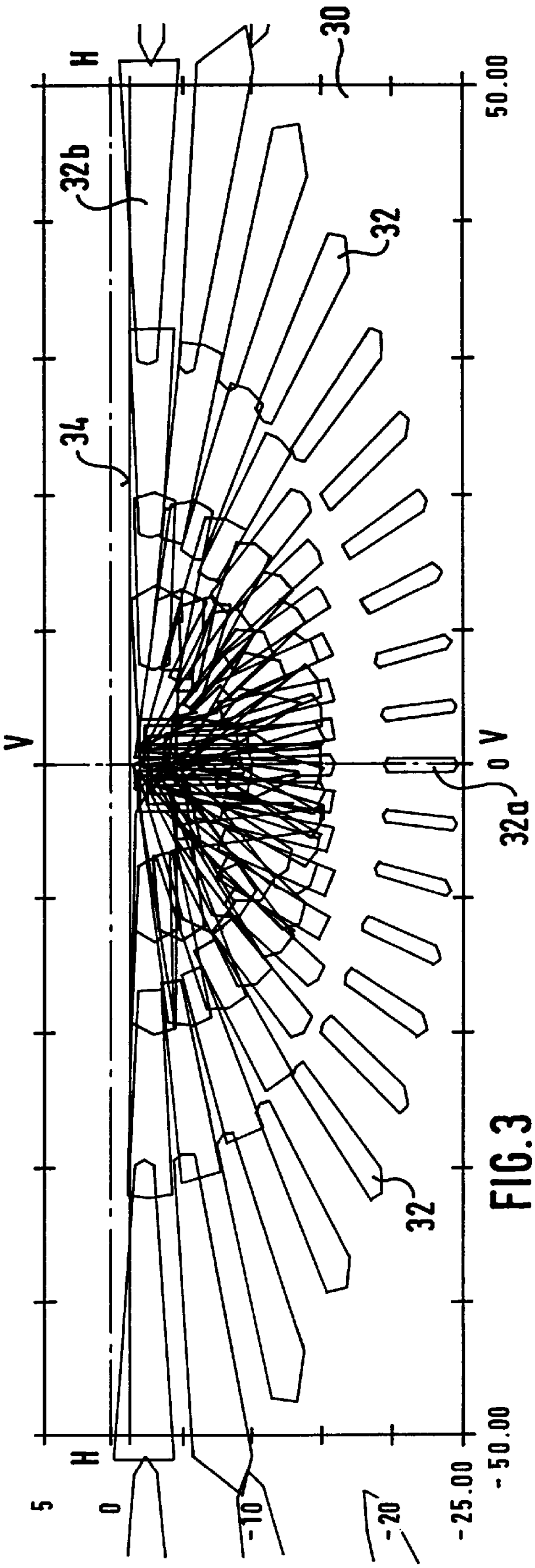
FIG.3
FIG. 4
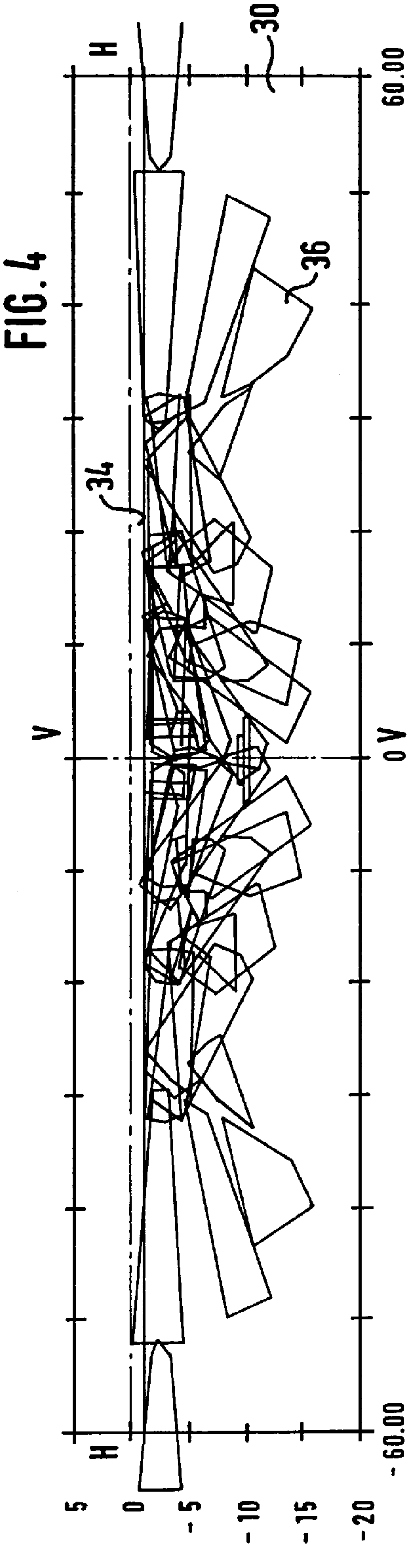

HEADLIGHT FOR VEHICLE

BACKGROUND OF THE INVENTION

The present invention relates to a headlight for vehicle.

More particularly, it relates to a headlight for vehicle, having a reflector, a light source and a collecting lens arranged after the reflector in a light outlet direction to reflect a converging light beam.

Headlights of the above mentioned general type are known in the art. One of such headlights is disclosed for example in the German patent document DE 36 02 262 A1. In addition to the reflector, the collecting lens, and the light source, the headlight disclosed in this reference has an aperture arranged between the reflector and the collecting lens for screening a part of the light beam reflected by the reflector. Therefore the light beam exiting the headlight has an upper bright-dark limit. The shade has an edge arranged so that the light beam exiting the headlight can pass along the edge and the course of the edge determines the course of the bright-dark limit. Since a part of the light beam reflected by the reflector is screened, this headlight has no optimal efficiency. Moreover, the shade involves increased manufacturing expense for the headlight and it must be exactly adjusted during the mounting so that the bright-dark limit assumes a predetermined position.

SUMMARY OF THE INVENTION

Accordingly, it is an object of the present invention to provide a headlight which avoids the disadvantages of the prior art.

In keeping with these objects and with others which will become apparent hereinafter, one feature of the present invention resides, briefly stated, in a headlight for a vehicle, in which the reflector is formed so that the images of the light source reflected by the reflector are arranged in an intermediate plane located in a focal point of the collecting lens perpendicular to the optical axis in the region of the reflector, above an imaginary line which corresponds to a height and side running of the bright-dark limit.

When the headlight is designed in accordance with the present invention, no shade is needed to produce the bright-dark limit of the light beam exiting the headlight, so that the efficiency of the headlight is improved and its manufacturing and mounting cost is reduced. The collecting lens can be taken substantially unchanged from the known headlight. When in accordance with the invention the reflector is formed so that the images of the light source reflected by the reflector are arranged in an intermediate plane in the region of the focal point of the collecting lens facing the reflector above an imaginary line corresponding to the side and height course of the bright-dark limit, the images of the light source after passage through the collecting lens are arranged under the bright-dark limit.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing longitudinal section of a headlight in accordance with the present invention;

FIG. 2 is a rear view of the reflector of FIG. 1 in accordance with the present invention;

FIG. 3 is a view showing a measuring screen with images of a light source reflected by an upper reflector part in accordance with a first embodiment of the invention;

FIG. 4 is a view showing a measuring screen with images of a light source reflected by a lower reflector part in accordance with the first embodiment of the invention;

DESCRIPTION OF PREFERRED EMBODIMENTS

Figure 5:
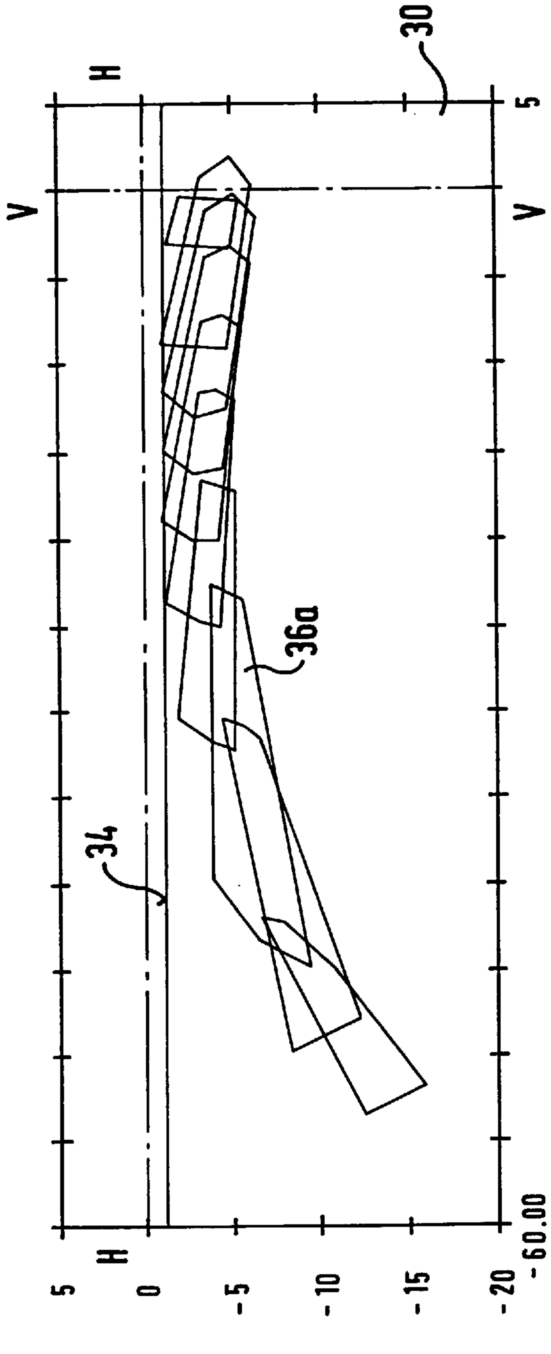
FIG. 5 is a view showing a measuring screen with images of the light source reflected by a lower reflector part in accordance with the first embodiment in the region of the 360–350° of FIG. 2.

A headlight for vehicles, in particular motor vehicles, shown in FIGS. 1 and 2 has a reflector which is identified with reference numeral 10 and a light source 12 inserted in the reflector. The light source 12 can be formed as an incandescent lamp or a gas discharge lamp or another suitable lamp. The light source 12 can have a light body 16 which extends in direction of an optical axis 14 or transversely to the optical axis 14. The reflector 10 can be composed of synthetic plastic or metal. A collecting lens 12 of glass or synthetic plastic is arranged after the reflector 10 as considered in a light outlet direction 18. The collecting lens 20 can have for example a flat side 21 facing the reflector 10 and a convexly curved side 22 facing away from the reflector 10. The convexly curved side 22 of the collecting lens 20 is formed for example aspherically and can be subdivided into a plurality of partial regions with identical or different aspherical design.

The reflector 10 has different partial reasons for reflecting the light emitted by the light source 12 or in other words by its light body 16 in a different way. As a whole, the light emitted by the light source 12 is reflected by the reflector 10 as a converging light beam. FIG. 2 shows the reflector 10 on a rear view in the light outlet direction 18, and angular positions for different partial regions of the reflector 10 are plotted correspondingly for the section planes which contain the optical axis 14 and limit the partial regions of the reflector 10. The horizontal plane 24 of the reflector 10 which contains the optical axis 14 extends through the section planes under 0° and 180°, and the vertical plane 26 of the reflector 10 which contains the optical axis 14 extends through the section planes under 90° and 270°.

Figure 9:
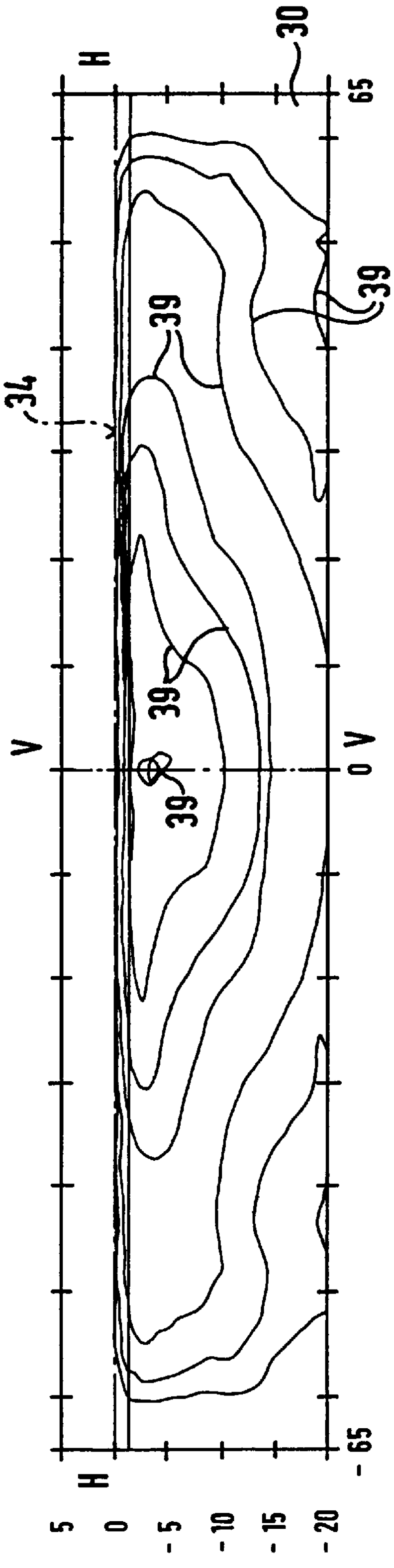
FIG. 9 is a view showing a measuring screen with an illumination intensity distribution produced by the light beam emitted by the headlight of the first embodiment.
Figure 16:
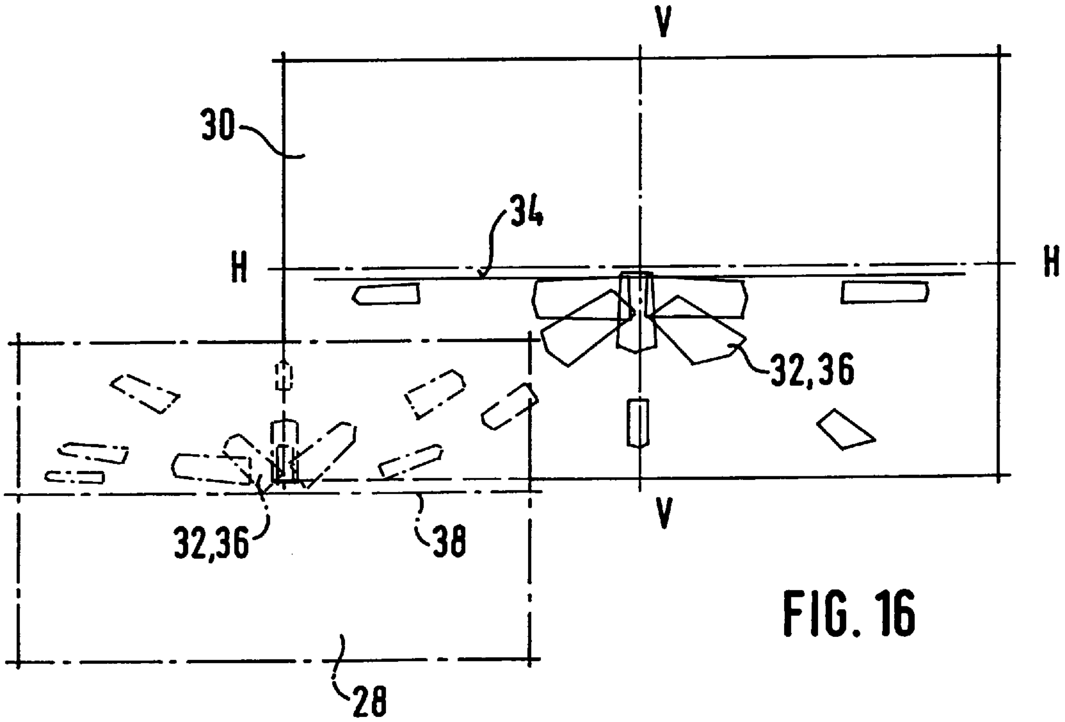
FIG. 16 is a view showing an intermediate image plane with images of the light source arranged in accordance with the first embodiment of the invention.

In accordance with a first embodiment of the invention, the headlight is formed as a fog headlight, so that it emits a widely dispersed light beam with a throughgoing horizontal upper bright-dark limit 34 in accordance with FIG. 9. FIGS. 3–9 show a measuring screen 30 arranged at a distance of for example 35 meter in the light outlet direction 18 from the headlight, perpendicular to the optical axis 14. It represents the projection of a roadway arranged in front of the headlight and correspondingly eliminated. The horizontal central plane of the measuring screen 30 which contains the optical axis 14 is identified as HH, and its vertical central plane containing the optical axis 14 is identified with VV. The reflector 10 in its part located above the horizontal plane 24 is formed so that images 32 of the light source 12 or its light body 16 reflected by this part are arranged after passage through the collecting lens 20 under the horizontal bright-dark limit 34 on the measuring screen 30. The bright-dark limit is arranged substantially under the horizontal central plane HH of the measuring screen 30. The images 32 of the light source 12 are located in an intermediate central plane 28 which is shown in FIG. 16 and arranged near the focal point of the collecting lens 20 facing the reflector 10 perpendicular to the optical axis 14, and above an imaginary line 38 which corresponds to a height and side course of the bright-dark limit 34.

The images 32 of the light source 12 reflected by the upper reflector part at the right side of the optical axis 14 are located after passage through the collecting lens 20 on the measuring screen 30 at the left of the vertical central plane VV, and the images 32 reflected by the upper reflector part at the left side of the optical axis 14 are located on the measuring screen 30 at the right of the vertical central plane VV. The images 32*a* of the light source 12 reflected by the regions of the upper reflector part near its vertical plane 26 are arranged in a vertical position, and the images 32*b* of the light source 12 reflected by the regions of the upper reflector part near its horizontal plane 24 are arranged in a horizontal position. The images 32 of the light source 12 reflected by the regions of the upper reflector part arranged between its vertical plane 26 and its horizontal plane 24 are arranged correspondingly in an inclined position between the vertical position and the horizontal position. Great images 32 of the light source 12 are therefore reflected by the regions of the reflector 10 near its apex region 11, and with increasing distance of a region of the reflector 10 from its apex region 11, the size of the images 32 of the light source 12 reflected by it decreases.

Figure 6:
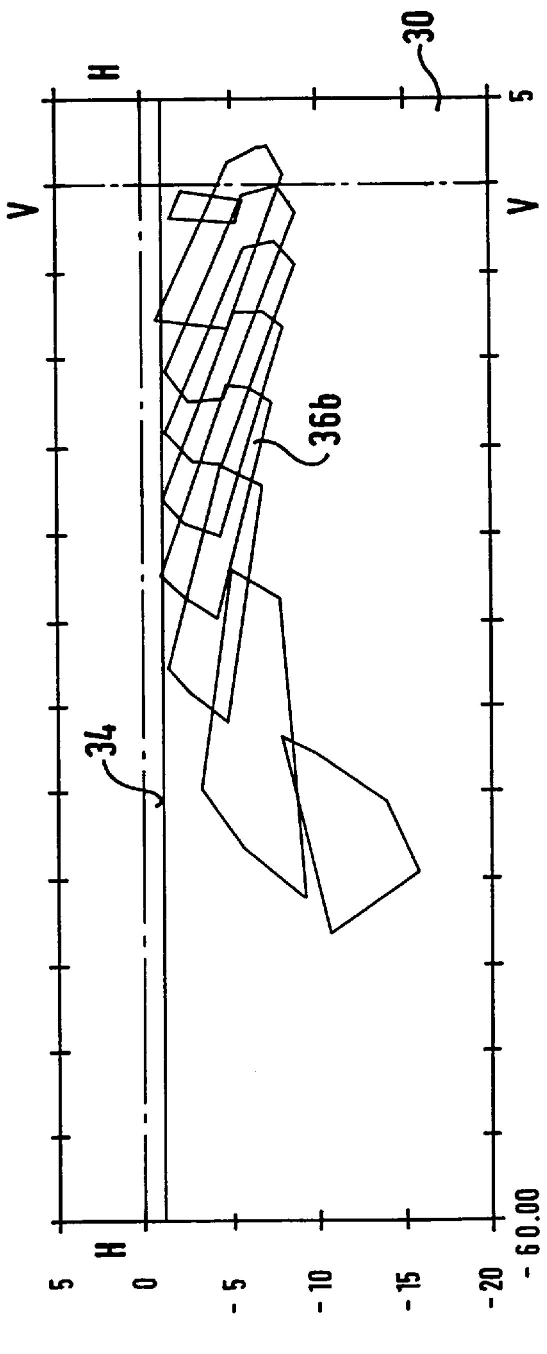
FIG. 6 is a view showing images of the light source reflected by a lower reflector part of the first embodiment in the region of 350–340°.
Figure 7:
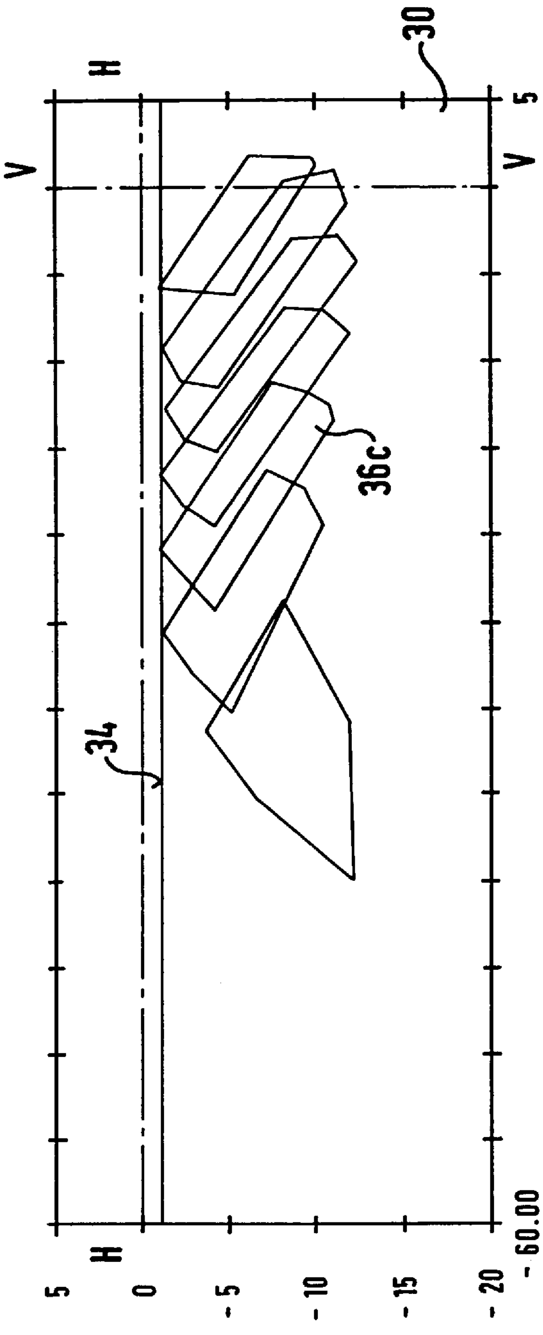
FIG. 7 is a view showing images of the light source reflected by a lower reflector part of the first embodiment in the region of 340–330°.
Figure 8:
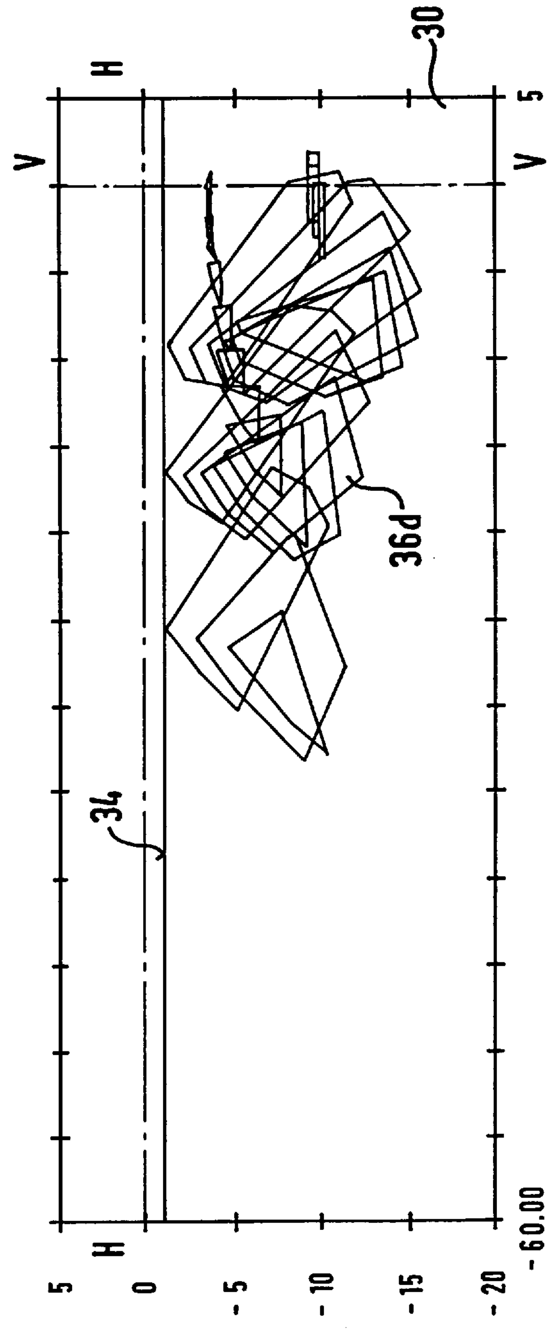
FIG. 8 is a view showing images of the light source reflected by a lower reflector part of the first embodiment in the region of 330–270°.

FIG. 4 shows the images 32 on the measuring screen 30 which are reflected by a lower reflector part arranged under the horizontal plane 24. The lower reflector part is formed so that the images 36 of the light source 12 reflected by it are arranged in the intermediate image plane 28 above the imaginary line 38, and after passage through the collecting lens 20 are arranged under the bright-dark limit 34. FIG. 5 shows the images 36*a* of the light source 12 reflected by the partial region of the reflector 10 arranged at the right side of the optical axis 14 in the region of approximately 360°–350° under the horizontal plane 24, after passage through the collecting lens 20 on the measuring screen 30, which are arranged correspondingly at the left side of the vertical central plane VV of the measuring screen 30. At least a part of the images 36*a* of the light source 12 reflected by this reflector region adjoin the bright-dark limit 34 with the highest point of the images. FIG. 6 shows the images 36*b* of the light source 12 reflected by a partial region of the reflector 10 arranged at the right side of the optical axis 14 in the region of the substantially 350–340° after passage through the collecting lens 20, of which at least a part adjoins the bright-dark limit 34 with the highest point of the images. FIG. 7 shows the images 36*c* of the light source 12 reflected by the partial region of the reflector 10 arranged at the right side of the optical axis 14 in the region of substantially 340–330° after passage through the collecting lens 20, of which at least a part adjoins with their highest points the bright-dark limit 34. The partial region of the reflector 10 arranged in the region between 360–330° forms a region arranged under the horizontal plane 24, which reflects the images 36*a, b, c* of the light source 12 so that after passage through the collecting lens 20 these images are arranged with their highest edges adjoining the bright-dark limit 34, and with the deepest points of these images arranged in the intermediate image plane 28 adjoin the imaginary line 38. With increasing distance of the region of the reflector 10 from its apex region 11, the images 36*a, b, c* of the light source 12 reflected by these regions are arranged at a distance under the bright-dark limit 34. In FIG. 6 the images 36*d* of the light source 12 reflected by the partial region of the reflector 10 at the right side of the optical axis 14 in the region of substantially 330–270° are shown after passage through the collecting lens 20 and arranged mainly with a distance under the bright-dark limit 34. The region of the reflector 10 between substantially 330° and 270° forms the images 36*d* of the light source 12 reflected by a region extending under the horizontal plane 24 starting from the vertical plane 26, of which after passage through the collecting lens 20 at least a part is arranged at a distance under the bright-dark limit 34 and in the intermediate image plane 28 at a distance above the imaginary line 38. In FIGS. 5–8 the images of the light source 12 reflected only from the parts of the reflector 10 arranged at the right side of the optical axis 14 are shown after passage through the collecting lens 20. The images of the light source 12 reflected by the parts of the reflector 10 arranged at the left side of the optical axis 14 in the angular region between 270° and 180° are mirror-symmetrical to the images shown in FIGS. 5–8 and arranged at the right side of the vertical central plane VV of the measuring screen 30. The images of the light source 12 reflected by the parts of the reflector 10 arranged under the horizontal plane 24 overlap as shown in FIG. 4.

The reflector 10 has a continuous reflection surface without steps or bends and is symmetrical to the vertical plane 26. FIG. 9 shows an illumination intensity distribution produced by the light beam exiting the headlight on the measuring screen 30, in accordance with several lines of the same illumination intensity, or so called isolux lines 39. This illumination intensity distribution has a great horizontal dispersion width which is required for a fog headlight. The horizontal dispersion width can amount to substantially 60° at both sides of the vertical central plane VV, and its data are plotted on the line extending at an angle between the optical axis 14 and to an edge of the illumination intensity distribution on the measuring screen 30. In the vertical direction the illumination intensity distribution extends under the horizontal central plane HH to substantially 20°.

Figure 10:
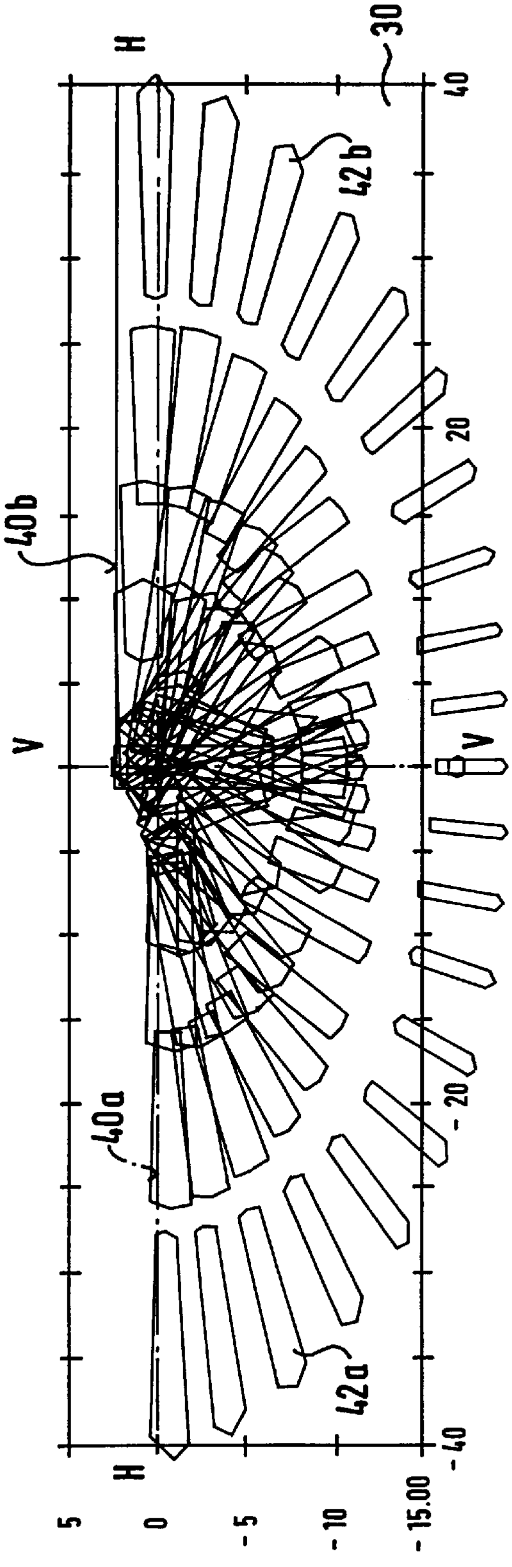
FIG. 10 is a view showing images of a light source on the measuring screen reflected by an upper reflector part in accordance with a second embodiment of the invention.

In a second embodiment of the invention, the headlight is used as a low beam headlight in accordance with SAE regulations. It emits a light beam which illuminates the measuring screen 30 of FIG. 15 with an upper bright-dark limit 40 having a first horizontal portion 40*a* on the opposite traffic side and a second portion 40*b* on the traffic side which is higher in a vertical direction than the first portion 40*a*. In the FIGS. 10–15 again the measuring screen 30 is arranged at a distance in the light outlet direction 18 from the headlight perpendicular to the optical axis 14. The reflector 10 with its part arranged above the horizontal plane 24 is formed so that it reflects the images 42 of the light source 12, in particular of its light body 16, so that after passage through the collecting lens 20 they are arranged on the measuring screen 30 under the bright-dark limit 40 as shown in FIG. 10. The portion 40*a* of the bright-dark limit on the counter traffic side, or in other words in this case at the left side of the measuring screen 30, is arranged substantially under the horizontal central plane HH of the measuring screen 30, and the portion 40*b* of the bright-dark limit on the traffic side or in other words in this case at the right side of the measuring screen 30 is arranged substantially above the horizontal central plane HH. The images 42*b* of the light source 12 are reflected by a part of the reflector 10 arranged at the left side of the optical axis 14, and after passage through the collecting lens 20 they are arranged under the right portion 40*b* of the bright-dark limit 40. The images 42*a* of the light source 12 reflected by the part of the reflector 10 at the right side of the optical axis 14 are arranged after passage through the collecting lens 20 under the left portion 40*a* of the bright-dark limit 40.

Figure 11:
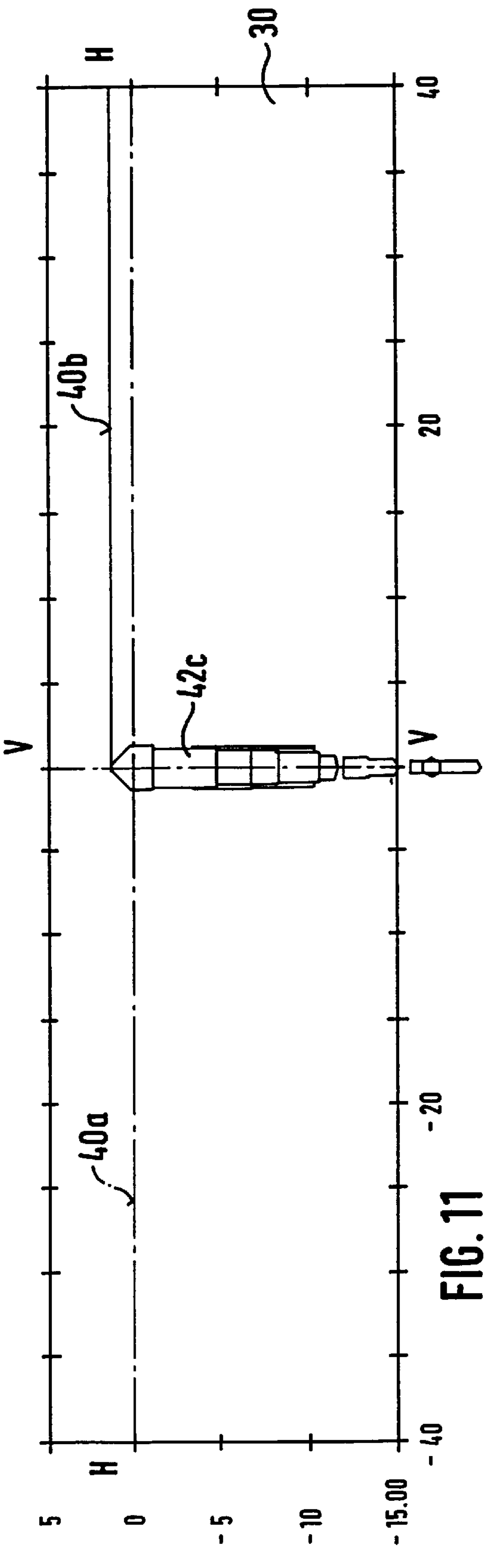
FIG. 11 is a view showing images of the light source reflected by an upper reflector part of the second embodiment in the region of substantially 90°.
Figure 17:
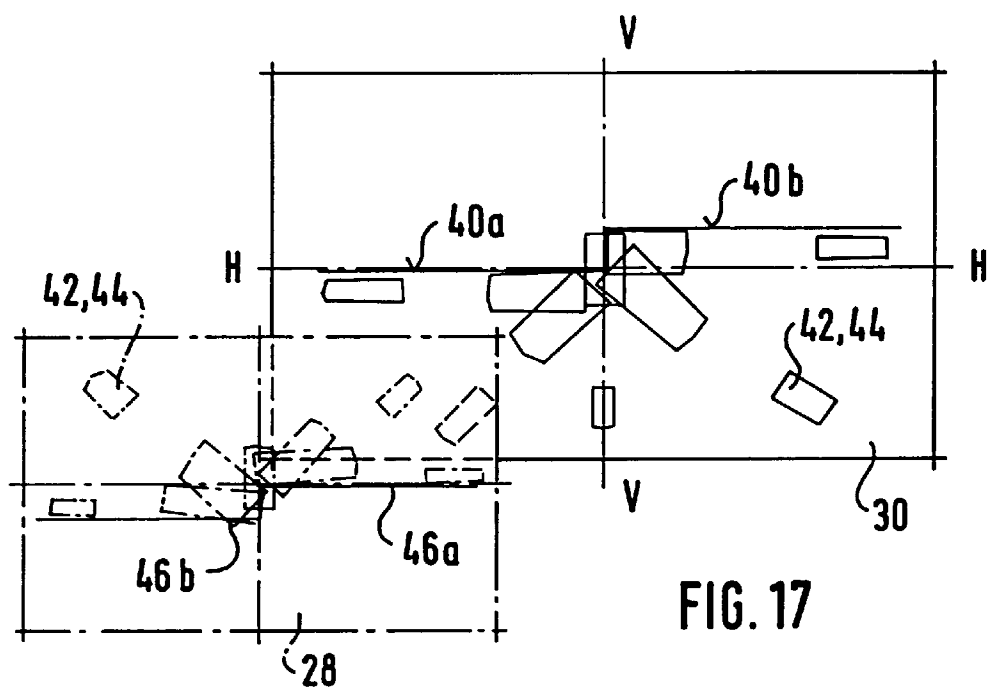
FIG. 17 is a view showing an intermediate image plane with images of the light source arranged in accordance with the second embodiment.

The images 42 of the light source 12 reflected by the part of the reflector 10 arranged above the horizontal plane 24 are located in FIG. 17 in an intermediate plane 28 arranged near the focal point of the collecting lens 20 facing the reflector 10 and perpendicular to the optical axis 14, above an imaginary line 46 corresponding to the height and side running of the bright-dark limit 40. The line 46 has a horizontal portion 46*a* at the right side of the optical axis 14 and corresponding to the portion 40*a* of the bright-dark limit 40, and a horizontal portion 46*b* at the left side of the optical axis 14 which is arranged deeper in a vertical direction than the portion 46*a* and corresponds to the portion 40*b* of the bright-dark limit 40. The images 42C of the light source 12 reflected by the regions of the upper reflector part near its vertical plane 26 are shown in FIG. 11 and located in a vertical position. A part of the images 42*a* extends with the upper most edges to the portion 40*b* of the bright-dark limit 40 as shown in FIG. 10. The images 42 of the light source 12 reflected by the regions of the upper reflector part located between the horizontal plane 24 and the vertical plane 26 are inclined, as in the first embodiment, more or less between the horizontal and the vertical positions. The size of the images 42 of the light source 12 reflected by the regions of the upper reflector part depends, as in the first embodiment, from the distance of the corresponding region from the apex region 11 of the reflector as shown in FIG. 10.

Figure 12:
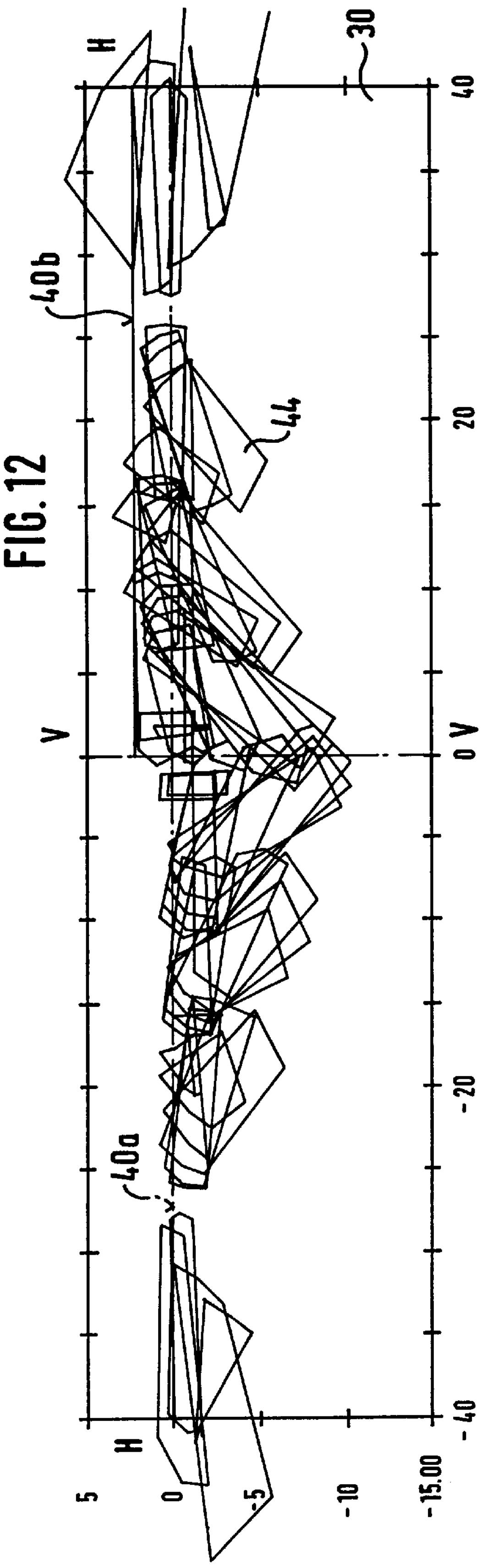
FIG. 12 is a view showing images of the light source reflected by a lower reflector part of the second embodiment.
Figure 13:
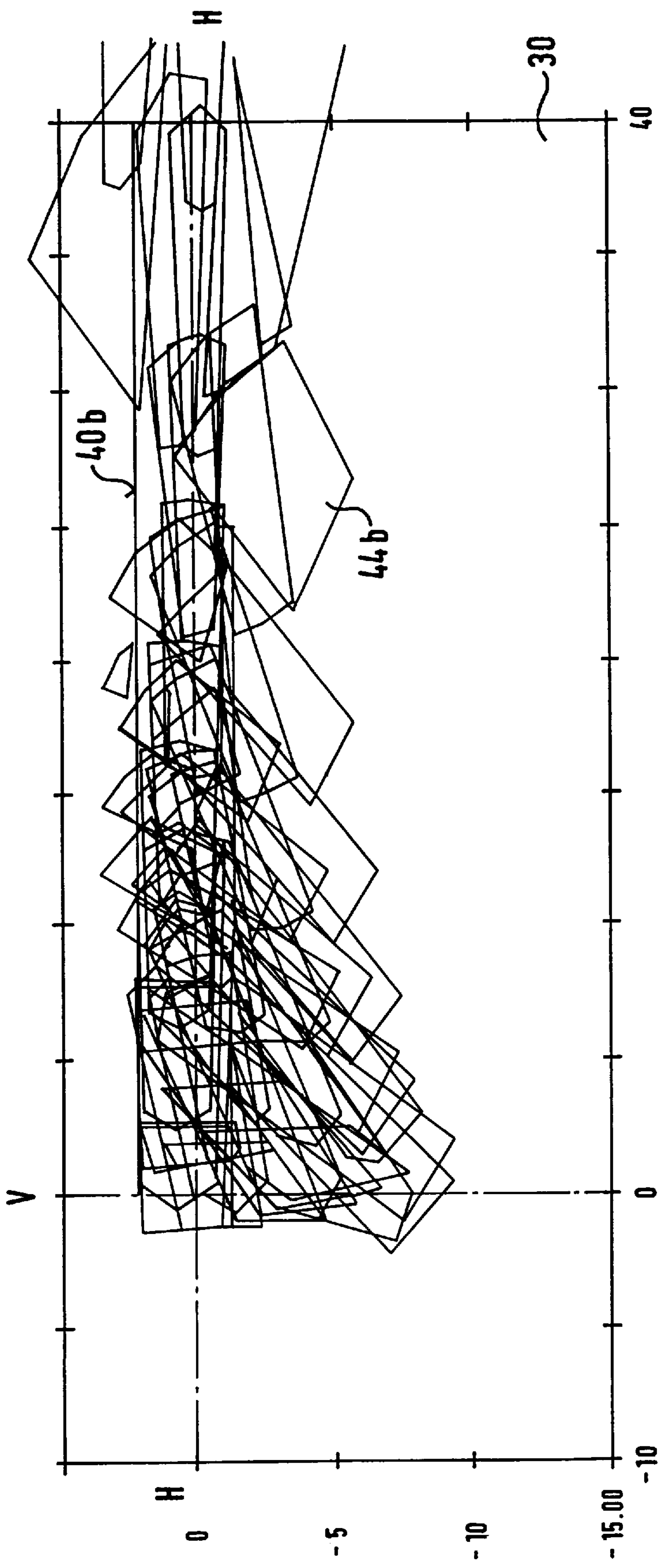
FIG. 13 is a view showing images of the light source reflected by a lower reflector part of the second embodiment in the region of 180–270°.
Figure 14:
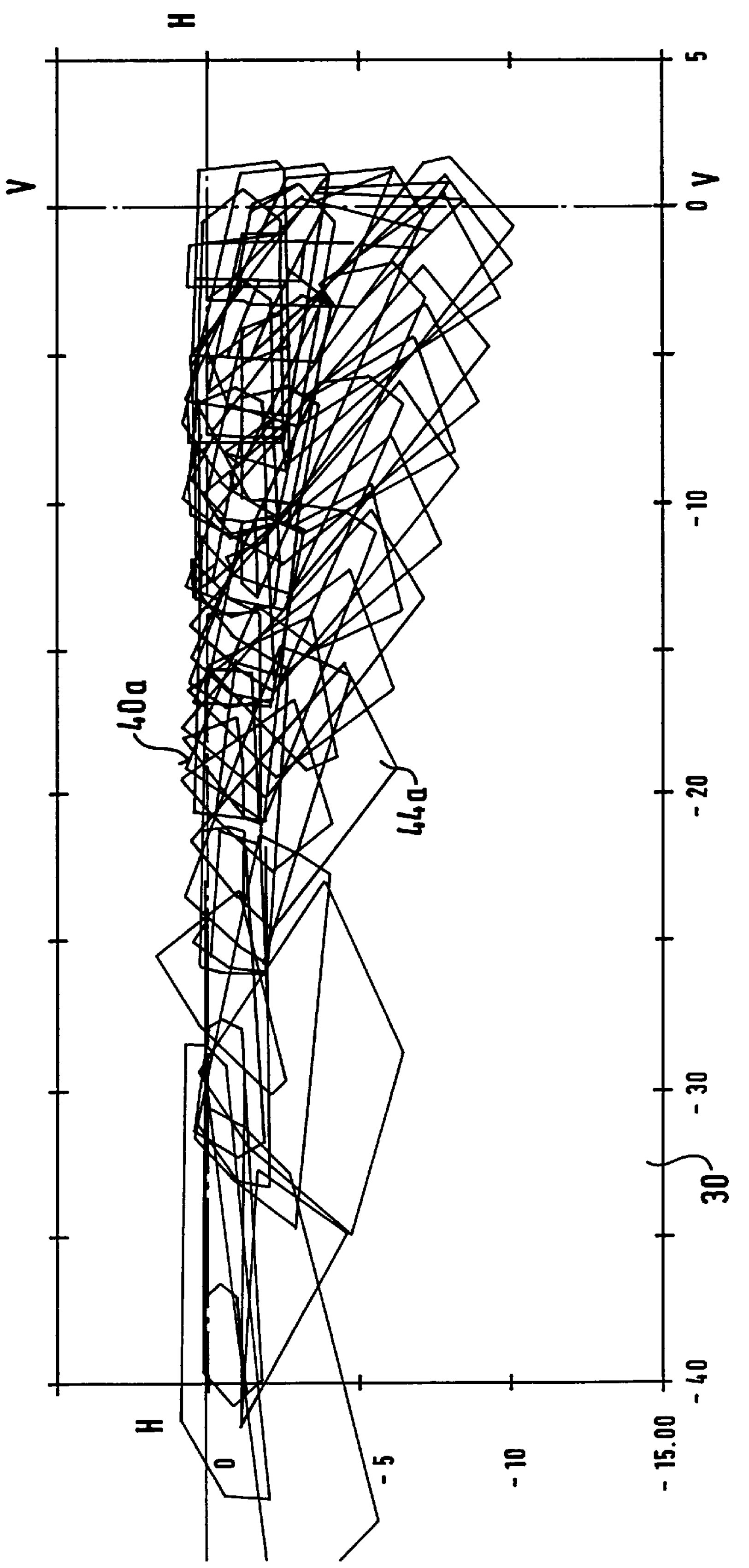
FIG. 14 is a view showing images of the light source reflected by a lower reflector part of the second embodiment in the region of 270–360°.

FIG. 12 shows the images 44 of the light source 12 reflected by a part of the reflector 10 located under the horizontal plane 24, which after passage through the collecting lens 20 are arranged under the bright-dark limit 40. FIG. 13 shows enlarged images 44*b* of the light source 12, which are reflected by the left half of the lower part of the reflector 10 and arranged after passage through the collecting lens 20 at the right side of the vertical central plane VV of the measuring screen 30. The images 44*b* of the reflector 10 extend to the portion 40*b* of the bright-dark limit 40. FIG. 14 shows the enlarged images 44*a* of the light source 12 reflected by the right half of the lower part of the reflector 10 and arranged correspondingly after passage through the collecting lens 20 at the left side of the vertical central plane VV of the measuring screen 30. The images 44*a* extend to the portion 40*a* of the bright-dark limit 40. The reflector 10 in accordance with the second embodiment also has a continuous reflection surface without steps or bends, but it is not formed symmetrically relative to the vertical plane 26 as shown in FIG. 2.

Figure 15:
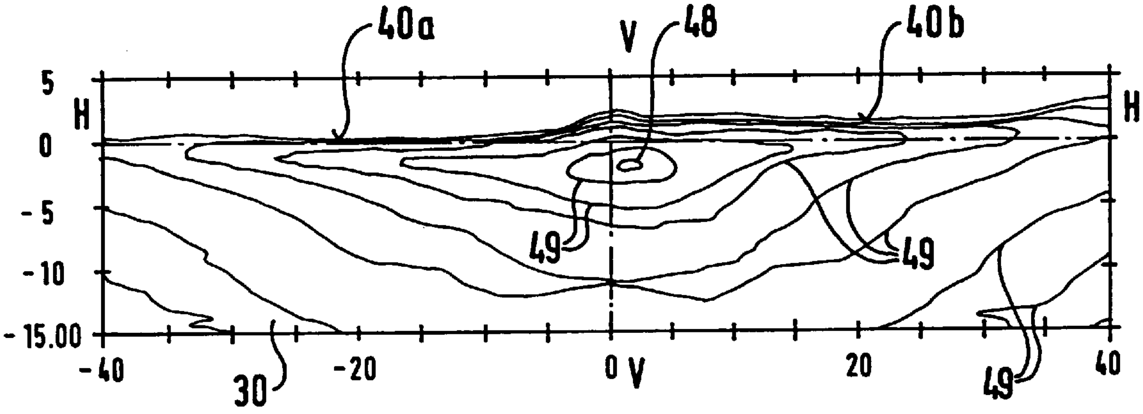
FIG. 15 is a view showing the measuring screen with an illumination intensity distribution produced by the light beam emitted by the headlight in accordance with the second embodiment.

The illumination intensity distribution produced by the light beam exiting the headlight on the measuring screen 30 is shown in FIG. 15 and represented by several isolux lines 49. This illumination intensity distribution has a smaller horizontal dispersion width that the illumination intensity distribution shown in FIG. 9 for the fog headlight. However, it has a more pronounced illumination intensity maximum 48 which is arranged substantially at the right side of the vertical central plane VV and under the horizontal central plane HH of the measuring screen 30. The illumination intensity distribution has a horizontal dispersion width of substantially +/−50° at both sides of the vertical central plane VV and extends underneath the horizontal central plane HH to substantially 15°.

Figure 18:
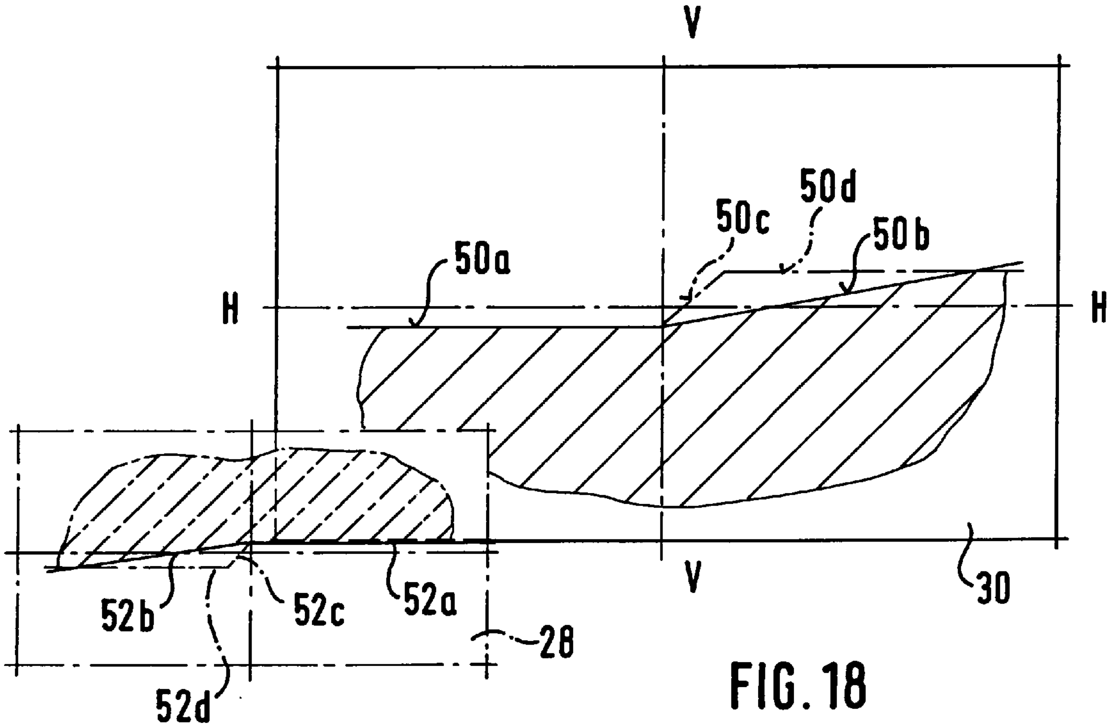
FIG. 18 is a view showing a measuring screen with regions illumination by a light beam emitted by a headlight in accordance with further alternative embodiments.

FIG. 18 shows the measuring screen 30 which is illuminated with the light beam emitted by the headlight, as well as the intermediate image plane 28. The headlight in accordance with a further embodiment can be formed so that it can be used as a low-beam headlight in accordance with ECE regulations. The light beam emitted by the headlight has therefore an upper bright-dark limit 50 with a portion 50*a* arranged at a counter traffic side or at the left side of the vertical plane VV of the measuring screen 30 in FIG. 18 and substantially under the horizontal central plane HH. It also has a portion 50*b* arranged at the traffic side at the right side of the vertical central plane VV and extending from the portion 50*a* to the horizontal central plane HH. The reflector 10 is formed so that it reflects the images of the light source 12 which are arranged in the intermediate image plane 28 above the height and side running of the bright-dark limit 50*b* in correspondence with the imaginary line 52*a, b,* and after passage through the collecting lens 20 are arranged under the bright-dark limit 50*a, b*. As in the above described second embodiment, the images of the light source 12 reflected from the right half of the reflector 10 are arranged after passage through the collecting lens 20 at the left side of the vertical central plane VV of the measuring screen 30, and the images reflected by the left half of the reflector 10 are arranged at the right side of the vertical central plane VV.

Alternatively, the bright-dark limit 50 can have a horizontal portion 50*a* arranged on the counter traffic side substantially under the horizontal central plane HH, a raising portion 50*c* at the traffic side after the vertical central plane VV as shown in a broken line in FIG. 18, and a horizontal portion 50*d* arranged after it and also shown in a broken line and located substantially above the horizontal central plane HH. The reflector 10 is formed so that it reflects the images of the light source 12 which are arranged in the intermediate image plane 28 above the height and side running of the bright-dark limit 50*a, c, d* in correspondence with the imaginary line 52*a, c, d,* and after passage through the collecting lens 20 are arranged under the bright-dark limit 50*a, c, d.* When the headlight is designed for the left traffic, the reflector 10 is correspondingly mirror-inverted relative to the vertical plane 26.

During the determination of the reflection surface of the reflector 10, one proceeds in steps. For example, starting from the apex region 11 of the reflector 10, the arrangement of the images of the light source in the intermediate image plane 28 to be reflected by the respective region or the arrangement of the images of the light source 12 to be reflected by the corresponding region are given on the measuring screen 30, with consideration of the action of the collecting lens 20. The position of the images of the light source or in other words whether they are arranged vertically or horizontally or inclined between these extreme positions, and the size of the images are given by the position of the corresponding region of the reflector 10 by physics law physical regularity. Based on the reflection law, the orientation of the corresponding region of the reflector 10 can be determined so that the images of the light source 12 are reflected by it in a predetermined arrangement in the intermediate image plane 28 and on the measuring screen 30. For successive regions, the arrangement of the images of the light source to be reflected by them is gradually changed. With stepped determination of a number of successive regions of the reflector 10, the whole reflector 10 with a continuous reflection surface is produced.

It will be understood that each of the elements described above, or two or more together, may also find a useful application in other types of constructions differing from the types described above.

While the invention has been illustrated and described as embodied in headlight for vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A headlight for a vehicle, comprising a reflector; a light source; a collecting lens arranged after said reflector in a light outlet direction so that light emitted by said light source is reflected as a converging light beam and the light beam exiting the headlight has an upper bright-dark limit, said reflector being formed so that images of said light source reflected by said reflector are located in an intermediate image plane which is perpendicular to an optical axis of said reflector in the region of a focal point of said collecting lens facing said reflector and above an imaginary line corresponding to a height and side course of said bright-dark limit and said bright-dark limit is formed without use of a shade.

2. A headlight as defined in claim 1, wherein said reflector has regions which extend starting from a vertical plane which contains said optical axis and under a horizontal plane which contains said optical axis and are formed so that at least a part of the images of said light source reflected by said regions are arranged in said intermediate image plane with a distance above said imaginary line and after passage through said collecting lens are arranged with a distance under said bright-dark limit.

3. A headlight as defined in claim 1, wherein said reflector is formed so that said imaginary line and said bright-dark limit extend continuously in a horizontal direction.

4. A headlight as defined in claim 1, wherein said reflector is formed so that said imaginary line and said bright-dark limit have horizontal portions located at both sides of said optical axis and offset relative to one another in a vertical direction.

5. A headlight as defined in claim 1, wherein said reflector is formed so that said imaginary line and said bright-dark limit have a horizontal portion at one side of said optical axis and another portion located at another side of said optical axis and inclined relative to a horizontal.

6. A headlight as defined in claim 1, wherein said reflector is formed so that said imaginary line and said bright-dark limit have a horizontal portion at one side of said optical axis, an inclined portion located at another side of said optical axis and adjoining said horizontal portion, and a further horizontal portion adjoining said inclined portion and offset in a vertical direction.

7. A headlight as defined in claim 1, wherein said reflector has a continuous, stepless and breakless reflection surface.

8. A headlight for a vehicle, comprising a reflector; a light source; a collecting lens arranged after said reflector in a light outlet direction so that light emitted by said light source is reflected as a converging light beam and the light beam exiting the headlight has an upper bright-dark limit, said reflector being formed so that images of said light source reflected by said reflector are located in an intermediate image plane which is perpendicular to an optical axis of said reflector in the region of a focal point of said collecting lens facing said reflector and above an imaginary line corresponding to a height and side course of said bright-dark limit without use of a shade, said reflector having regions which extend downwardly in horizontal planes which contain said optical axis and formed so that the images of said light source reflected by said regions in said intermediate image plane adjoin with their deepest points said imaginary line and after passage through said collecting lens adjoin with their highest points said bright-dark limit.

* * * * *